June 28, 1966  D. A. HOYT  3,257,899
MULTIPLE-SCAN PROJECTOR APPARATUS
Filed June 27, 1963  3 Sheets-Sheet 1

INVENTOR.
DONALD A. HOYT
BY
ATTORNEY

June 28, 1966  D. A. HOYT  3,257,899
MULTIPLE-SCAN PROJECTOR APPARATUS
Filed June 27, 1963  3 Sheets-Sheet 2

INVENTOR.
DONALD A. HOYT

ATTORNEY

June 28, 1966   D. A. HOYT   3,257,899
MULTIPLE-SCAN PROJECTOR APPARATUS
Filed June 27, 1963   3 Sheets-Sheet 3
Fig. 5
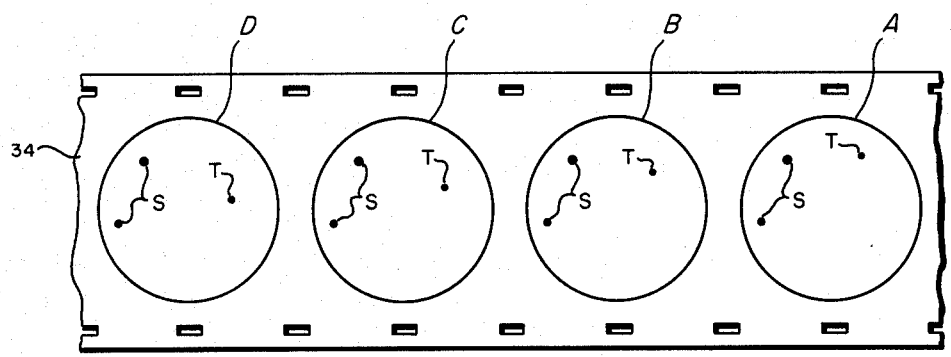
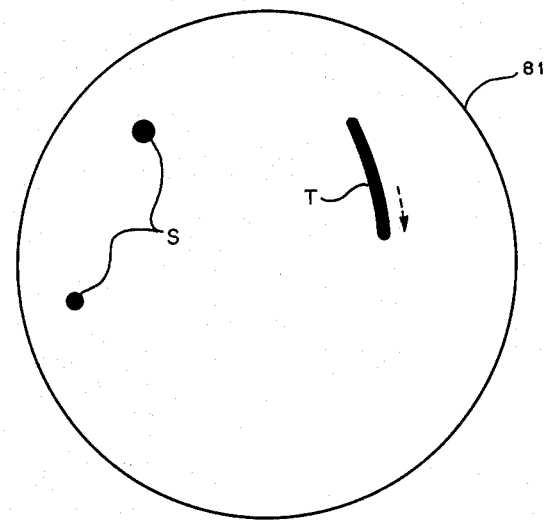
Fig. 6
INVENTOR.
DONALD A. HOYT
BY
ATTORNEY

United States Patent Office 3,257,899
Patented June 28, 1966

3,257,899
MULTIPLE-SCAN PROJECTOR APPARATUS
Donald A. Hoyt, Willow Grove, Pa.
(229 Beatrice Ave., Hatboro, Pa.)
Filed June 27, 1963, Ser. No. 291,223
6 Claims. (Cl. 88—24)

The invention described herein may be manufactured and used by or for the Government of the United States of America for governmental purposes without the payment of any royalties thereon or therefor.

The present invention relates to display apparatus and more particularly to a multiple-scan projector for indicating the recent course and velocity of objects photographed in space.

In military aircraft, target information is usually obtained by radar and displayed on a CRT-type plan position indicator. Of course, other reflected and/or otherwise returned wave systems may provide the target information, such as sonar. The recent course and velocity of the target can be determined by marking the target positions on the CRT screen by the observer with a grease pencil at equal time intervals. After several intervals they can be analyzed for predicting the future course and velocity of the target. The maximum number of targets one observer can efficiently monitor for this purpose is about five. Moreover, a target surrounded by a cluttered or "noisy" background is not so easily discernible or it could be lost due to the inability of the observer to ascertain which of the displayed matter is the target. These shortcomings of limited monitoring and indiscernibility have become recognized as evidenced by recent developments.

One such development utilizes a so-called "time compression" technique. Photographs are taken of a radar display at constant intervals and they are projected on a screen in the same order as taken but at a more rapid rate. For example, each picture of the radar display is taken every ten seconds, and a series of twelve such pictures are projected at the rate of twenty-four frames per second. The display time is thus "compressed" 240 times. A more detailed description of this technique and the advantages obtained therefrom are set forth in U.S. patent application Serial No. 282,520 for Display Apparatus filed by Marvin J. Foral, filed May 22, 1963.

The apparatus disclosed in application Serial No. 282,520, supra, contemplates a separate camera, film developer and projector, the latter comprising a plurality of optical systems arranged along the length of the intermittently moving film. Each optical system contains its own light source and a shutter, the latter being sequentially actuated by a synchronously operated selector switch. Such a system obviously requires careful alignment of numerous optical elements rendering the device delicate and large. The in-line arrangement of optical systems projecting on a single screen area also requires compensation against distortion in order that the projected image distances to be measured for navigation and tracking purposes be precise. Furthermore, the presence of a plurality of projection lamps presents a heat problem in the close confines of a heavily instrumented air craft.

Accordingly, it is an object of the present invention to provide a multiple-scan projector apparatus for use with a "time-compression" display technique which clearly and perceptibly distinguishes detected objects moving relative to each other in space and which substantially continuously indicates the recent course and velocity taken by each of such objects.

Another object of the invention is to provide a multiple-scan projector apparatus in which a continuous display of an area of interest is periodically photographed and projected on a screen at a faster rate than photographed; thereby discerning the detection of moving objects from a stationary background, or a moving background from stationary objects.

Still another object of the invention is to provide a multiple-scan projector apparatus especially suitable for use with airborne object detection equipment which distinguishes relatively moving targets from cluttered backgrounds, and which is simple in construction and reliable in operation, inexpensive to manufacture, lightweight, compact and sturdy.

A still further object of the invention is to provide a multiple-scan projector apparatus which utilizes a single optical projection system for projecting a series of picture frames in rapid sequence, and which produces no distortion nor presents a heat problem, thereby rendering it ideally suited for airborne use.

Various other objects and advantages will appear from the following description of one embodiment of the invention, and the most novel features which will be particularly pointed out hereinafter in connection with the appended claims.

In the drawings:

FIG. 5 illustrates a representative series of pictures on a segment of photographic film as applied in the projector apparatus of FIG. 1; and FIG. 6 illustrates the optical illusion created by the projector apparatus when the pictures of FIG. 5 are sequentially projected on a screen at a cine rate.

Figure 1:
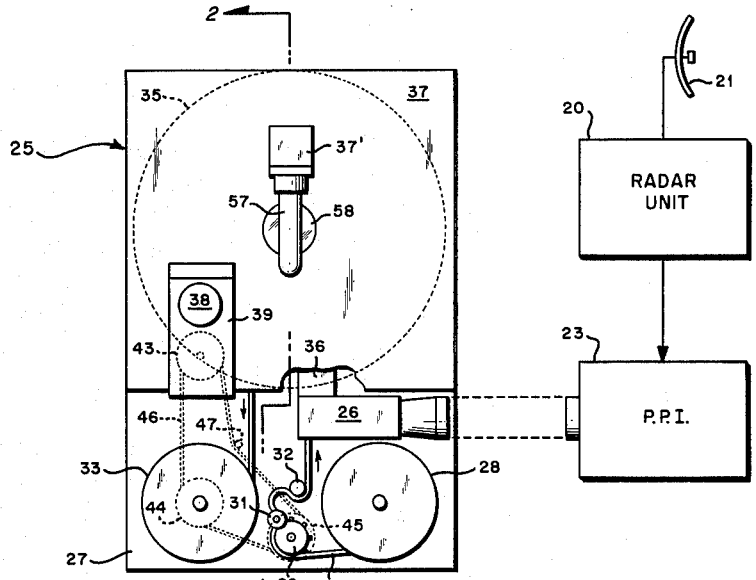
FIG. 1 represents a rear view of the multiple-scan projector apparatus of the present invention as applied in a plan position indicating system.

In the illustrated embodiment of the invention FIG. 1 shows a scanning-type radar unit 20 which detects the range and bearing of wave energy reflecting objects. A constant rotating antenna 21 provides a complete 360° scan. The range and bearing of the detected objects are transposed in a visual display on a CRT-type plan position indicator 23. Of course, it should be understood that the inventive concept is not limited to a particular mode of object detection or plan position indicator. The CRT visual display is periodically photographed on film which, in turn, is processed and projected onto a screen at a rate faster than photographed by means of a multiple-scan projector apparatus indicated generally by the numeral 25.

The indicator 23 is positioned relative to the apparatus 25 so that a shutter-less camera 26 thereof is optically trained on the visual display. The camera 26 is fixed to a primary support plate 27 which also provides axial support to a film supply reel 28, a film feed sprocket 29, idlers 31 and 32, and a take-up reel 33; each being independently rotatable about its respective axis. A film 34 from the supply reel 28 threads about the sprocket 29 and idlers 31 and 32 into the camera 26 for exposure to the display on the indicator 23; then it proceeds into a rapid process film developer 36, through a projection system partially supported by a cylindrical rear enclosure 35, and finally to the take-up reel 33 for storage. The rearward end of the cylindrical enclosure 35 is defined by a rectangular end plate 37. The film feed sprocket 29 and the take-up reel 33 are driven by an electric constant speed, film transport and drum drive motor 38 through a pulley drive connection. The motor 38 is fixed next to the outside of the plate 37 by a bracket 39, and the motor shaft drivingly connected to gears 41 at one end of a pulley shaft 42 which is journaled in the plates 27 and 37. A driver pulley 43 fixed on the other end of the shaft 42 rotates driver pulleys 44 and 45 coaxially fixed to the take-up reel 28 and the sprocket 34 through a non-slip drive belt 46 connected therebetween. A belt guide pin 47 axially supported in the plate 27 displaces the one side of the belt 46 in order to utilize maximum surface contact between the belt 46 and the pulley 43 and the sprocket pulley 45.

Figure 2:
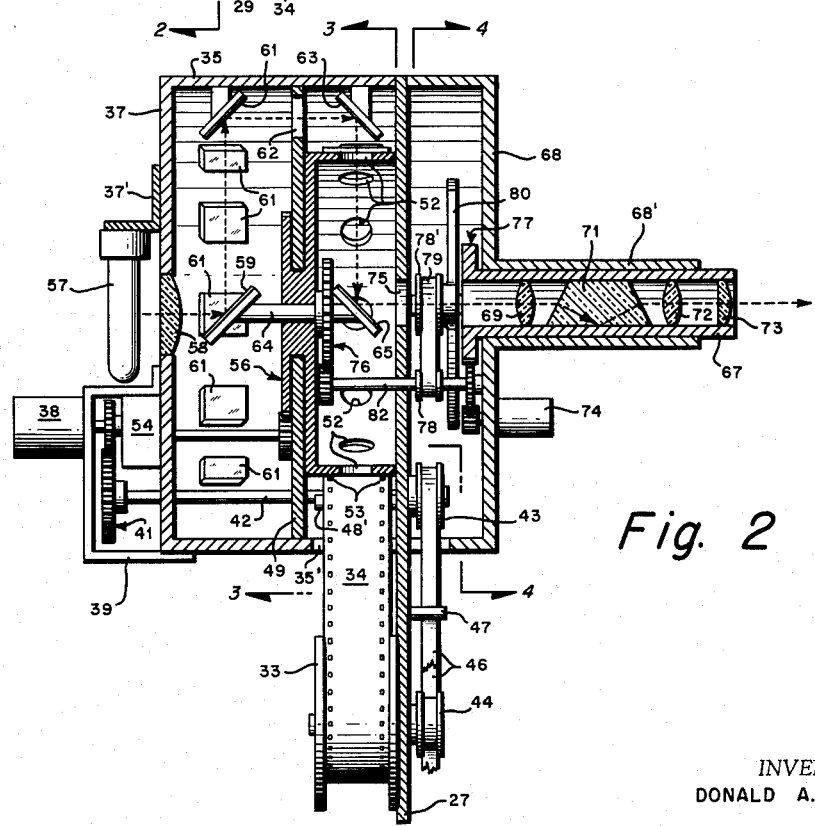
FIG. 2 represents a longitudinal cross-section of the projector apparatus taken along the line 2—2 of FIG. 1.
Figure 4:
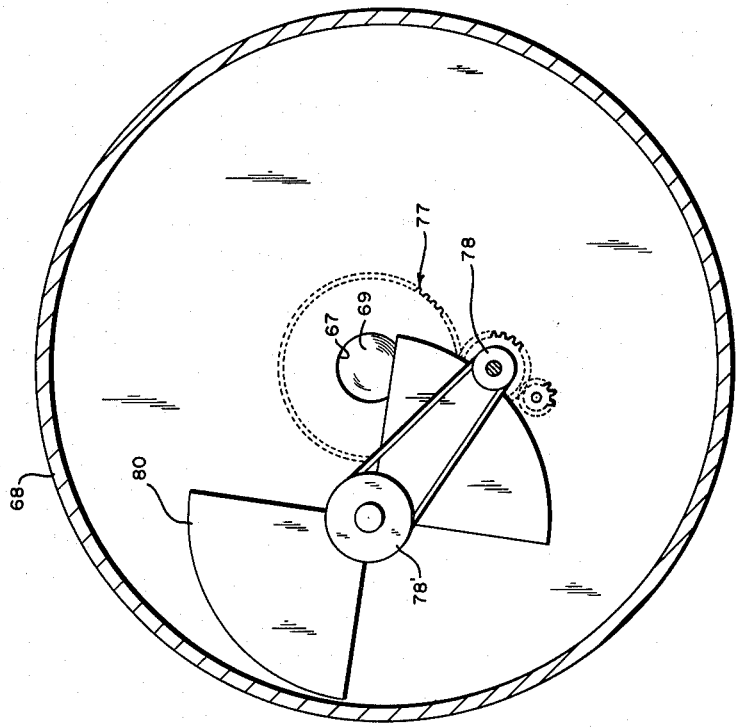
FIG. 4 represents another transverse cross-section of the projector apparatus taken along the line 4—4 of FIG. 2.
Figure 3:
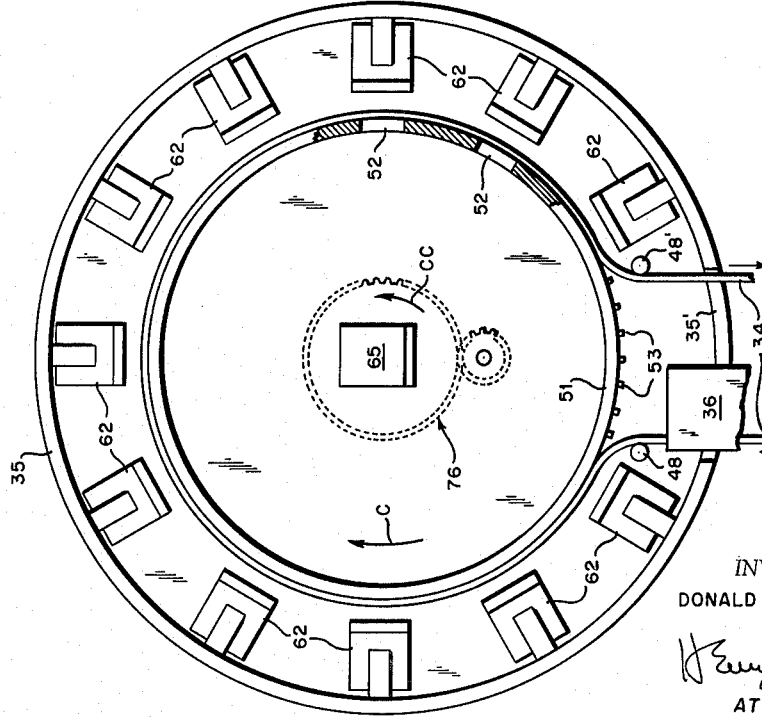
FIG. 3 represents one transverse cross-section of the projector apparatus taken along the line 3—3 of FIG. 2.

The projector system to which the film 34 passes from the developer 36 is best explained particularly with reference to FIGS. 2, 3 and 4. From the developer 36, the film 34 threads around a film idler 48, axially secured between the plate 27 and an auxiliary support plate 49. The film 34 continues through an aperture 35' in the enclosure 35 onto a cylindrical film drum 51, then through the aperture 35' and about a film idler 48' to the take-up reel 33. The rear cylindrical enclosure 35 to which the plate 49 is fixed maintains the latter in spaced relationship to the plate 27. The plate 49 also rotatably supports the cylindrical film drum 51 between the plates 27 and 49 coaxial with the cylindrical axis of the enclosure 35. The drum 51 defines a plurality of circular apertures 52 aligned in one transverse plane. The angles subtended by the radial center lines of each pair of apertures 52 are equal to each other. The angle subtended by the apertures 52 and the drum diameter are determined by the distance between centers of adjacent pictures on the film exposed in the camera 26. In the illustrated embodiment, the drum 51 contains twelve apertures 52. The drum 51 further includes sprocket teeth at its periphery for engaging the film perforations thus insuring against film slippage.

The film 34 is transported the distance between picture centers through the camera 26, developer 36, and about the drum 51 intermittently. The time interval between each film transport corresponds to one complete revolution of the radar scanning antenna 21. The constant speed drive motor 38 accomplishes this through an intermittent drive transmission 54, such as a Geneva mechanism, by rotating the drum 51 through transmission gears 56. The film loop between idlers 31 and 32 permits relative transport of the film on the sprocket 29 and the drum 51. The transmission 54 and the gears 56 are selected so that the drum 51 will rotate the 30° angle subtended by each adjacent pair of apertures and will dwell for the ten-second period required by the radar scanning antenna 21 to make one complete revolution.

In the illustrated embodiment, it is now apparent that a sequence of eleven pictures periodically photographed by the camera 26 will register on the periphery of the drum 51. The linear film distance between the developer 36 and the first encountered aperture 52 is determined so that each picture exactly registers with an aperture 52 in the drum 51. As viewed in FIG. 3, the most recent photographed picture appears at the "seven o'clock" position and the earliest picture appears at the "five o'clock" position; the drum 51 being rotated clockwise as shown by the arrow C.

Each of the pictures registering with an aperture is periodically subjected to a scanning light beam originating from a projector lamp 57 secured to the plate 37 by an angle bracket 37' at the cylindrical axis of the enclosure 35. The light generated thereby is directed through a condenser lens 58 in the plate 37 to an indexing mirror 59, both of which are coaxially positioned along the enclosure axis. The mirror 59 is fixed on one end of a mirror shaft 64 which in turn is coaxially journaled with the drum 51 for rotation independently thereof. Rotation is imparted to the mirror shaft 64 by a constant speed, electric scanning motor 74 through gears 76, shaft 82 and gears 77; the shaft 64 being axially supported by the plate 27 for rotation relative thereto. The direction of rotation of the indexing mirror 59 is counterclockwise as shown in FIG. 3 by the arrow CC. The mirror 59 is inclined 45° from its rotating axis in order to reflect the light beam from the condenser 58 radially outward 90° therefrom. A first plurality of inclined mirrors 61 are fixed in the same transverse plane to the enclosure 35 to form a circular pattern coaxial with the cylindrical axis of the enclosure 35. The number of mirrors 61 is equal to the number of apertures 52 on the drum 51 minus the number of apertures 52 not registering with pictures adjacent to the enclosure aperture 35'. Adjacent mirrors 61 are circumferentially spaced so that they each lie in the radial plane of an aperture center line during drum dwell. Each mirror 61 is inclined 45° from the direction of the radially directed light beam thereby reflecting the light forwardly 90° therefrom.

The light beam from each mirror 61 passes through an aperture 62 in the auxiliary plate 59 and is reflected radially inward 90° therefrom by a second plurality of inclined mirrors 63. Each mirror 63 is fixed to the enclosure 35 and corresponds in position to one of the mirrors 61 except that it is inclined 45° from the forwardly directed light beam.

The other end of the mirror shaft 64 opposite from the indexing mirror 59 terminates within the drum 51 and supports a scanning mirror 65 for simultaneous rotation with the indexing mirror 59. The mirror 65 is also inclined at 45° from the radially inward directed light beam, thereby reflecting the light beam forwardly therefrom. The light beam reflected from the scanning mirror 65 proceeds into a cylindrical de-spin tube 67 which is journaled in a tubular extension 68' of a front cylindrical enclosure 68 for rotation relative thereto. The de-spin tube 67 is coaxial with the cylindrical enclosure 35, and rotates in the same direction as the indexing and scanning mirrors 59 and 65 but at one-half of their speed. This is accomplished by the scanning motor 74 through gears 77 which are drivingly connected between the shaft 82 and the de-spin tube 67, the transmission ratio of the gears 77 being one-half of the gears 76.

Of course, it is obvious that optical prisms could be substituted for the mirrors 59, 61, 63 and 65 without departing from the inventive concept.

The de-spin tube 67 includes a collimator lens 69, a dove prism 71, a transfer lens 72, and a projecting lens 73, which will receive the light beam from the mirror 65, and according to well-known optical principles invert any image projected thereby to a screen, not shown. Coupled with the one-half speed, inversion of the image maintains a constant orientation of the projected image on the screen irrespective of the drum position being scanned by the scanning mirror 65. In the illustrated embodiment, the indexing and scanning mirrors 59 and 65 are driven at one and one-third revolution per second—a speed which will scan the twelve apertures 52 at a cine rate of sixteen frames per second. The speed of the de-spin tube 67 is therefore two-thirds of a revolution per second. Of course, other image inversion devices are contemplated instead of the dove prism 71. For example, the well-known "K" mirror or Schmidt prism may be more expedient or better suited for a particular requirement.

It is well known in the photography art that, to avoid blur at a cine rate, a shutter is required to interrupt projection during film transport. This is provided for in the invention by a double-acting shutter 78 axially connected to the front enclosure 68 for rotation relative thereto. The shutter 78 comprises two opposite 90° planar sectors of a circle, the axis of rotation of the shutter 78 being at their common apexes. The axis is positioned next to the opening of the tube 67 so that each sector of the shutter 78 will occlude the light beam from entering the de-spin tube 67 for two one-quarter revolutions of the shutter 78. The rotational speed of the shutter 78 corresponds to the number of picture frames scanned per second thereby providing two interruptions in light projection during each frame. These interruptions eliminate objectionable light flicker. In the illustrated embodiment, the shutter 78 rotates at a speed of 16 revolutions per second thereby providing two one-sixty-fourth second occlusions or closures per second.

A summary of operation of the multiple-scan projector apparatus will be explained with further reference to a representative series of pictures A, B, C and D on a segment of the photographic film 34 as shown in FIG. 5. Each time a segment of the film 34 dwells in the camera 26, as determined by the Geneva mechanism 54, the display produced by a complete scan of the antenna 21 is exposed thereon. The segment of exposed film 34 is then transported from the camera 26 into the rapid process film developer 36 where a picture A is formed and chemically fixed thereon. During development of the picture A, an adjacent segment of the film 34 is exposed in the camera 26 to the display produced by the next scan of the antenna 21. After this antenna scan, picture A advances to the seven o'clock position (FIG. 3) on the drum 51, the adjacent exposed segment enters the developer 36, and still another segment is ready for exposure. During the next antenna scan, picture B is formed and fixed adjacent to picture A. Then, the picture B proceeds to the seven o'clock position on the drum 51 while picture A proceeds to the eight o'clock position. The exposing and developing steps are repeated during each antenna scan while the film 34 dwells as determined by the Geneva mechanism 54. Pictures C and D are also shown in FIG. 5 and represent subsequent antenna scans. A plurality of pictures of the display on the indicator 23 produced by sequential antenna scans thus register with apertures 52 on the drum 51. When picture A reaches the five o'clock position (FIG. 3), and the scanning mirror 65 is rotating in the opposite direction as indicated by the arrow CC, the images recorded will be projected in the sequence of pictures A, B, C, D, etc., at a rate determined by the number of apertures 52 selected for the drum 51 and the rotational speed of the indexing and scanning mirrors 59 and 65.

It is now apparent, since the display on the indicator 23 were photographed at a relatively slow rate (such as one picture every ten seconds) and they are projected at a much higher rate (such as sixteen pictures per second), very slow moving objects will appear clearly and perceptibly as moving objects on a screen. There is a so-called "time compression" of 160 times in the disclosed embodiment. A composite picture 81 (FIG. 6) appears on a screen which provides a cyclical illusion of a slowly advancing and quickly retreating image among stationary images. The locus or track of the images is visible to the eye and will indicate the recent course taken by moving objects. The length of the track provides a basis for closely estimating the recent velocity of the moving objects. Referring to FIGS. 5 and 6, for example, a target T is first photographed and appears in picture A as shown. Ten seconds later, picture B shows that the target T has moved to a new position. Pictures C and D similarly show further displacements of the target T in successive ten-second intervals. When these four target positions are projected at a cine rate in the same order as their exposure, they appear in the composite picture 81 as a single line which slowly advances in a direction shown by the dotted arrow, and rapidly retreats to its starting position. It will be observed that stationary objects S, since they do not change position between pictures, also appear stationary in the composite picture 81.

A suitable control system is further contemplated for use with the apparatus as disclosed which will permit an observer to select a particular picture on the film 34 for stationary (non-scanning) projection. Such a system may employ well-known control techniques.

It will be understood that various changes in the details, materials, steps, and arrangement of parts, which been herein described and illustrated in order to explain the nature of the invention, may be made by those skilled in the art within the principle and scope of the invention as expressed in the appended claims.

What is claimed is:

1. A multiple-scan projector apparatus for quickly discerning moving objects from stationary objects detected in space, comprising:
   a cylindrical housing,
   a strip film supply reel and a film take-up reel axially supported on the outside of said housing for rotation relative thereto,
   a film feed sprocket axially supported on the outside of said housing for rotation relative thereto and adjcaent to said supply reel for unreeling the film therefrom,
   a shutter-less camera supported on the outside of said housing adjacent to said sprocket for photographing a visual display of a planned position indicator on the film received from said sprocket,
   a first motor drivingly connected to said sprocket and said take-up reel for continuously transporting the film from said supply reel onto said take-up reel,
   a rapid process film developer supported on the outside of said housing adjacent to said camera for developing film received from said camera,
   a film drum coaxially supported inside of said housing for receiving the film from said developer around its circumference, and for transporting the film to said take-up reel, said drum including a plurality of apertures equally spaced about the circumference with the distance between aperture centers equal to the distance between centers of pictures photographed on the film,
   an intermittent transmission drivingly connected between said first motor and said drum for intermittently rotating the latter at a relatively slow speed in angular increments equal to the angle subtended by the radial center lines of adjacent apertures,
   a projector lamp coaxially mounted on said housing,
   a condenser coaxially mounted on said housing for directing the light from said lamp along the housing axis,
   an indexing mirror coaxially supported in said drum for rotation relative thereto and inclined to reflect the light from said condenser in a direction radially outward,
   a second motor drivingly connected to said indexing mirror for continuous rotation thereof at a relatively high speed,
   a first plurality of inclined mirrors fixed to the inside of said housing in a circle coaxial therewith for reflecting the radially outward light in a direction parallel to the housing axis,
   a second plurality of inclined mirrors fixed to the inside of said housing in a circle coaxial therewith for reflecting the parallel light in a direction radially inward through said apertures when registering therewith,
   the position of each mirror in said first and second pluralities being arranged about the housing axis to correspond with an aperture position during dwell of said intermittently rotating drum,
   a scanning mirror coaxially fixed to said indexing mirror for rotation therewith and inclined to reflect the radially inward light in a direction along the housing axis,
   a de-spin tube coaxially supported in said housing for rotation relative thereto and including a collimator, and inversion prism, a transfer lens and a projecting lens each coaxial with the housing axis for projecting the axially directed light from said scanning mirror onto a screen,
   a first transmission drivingly connected between said second motor and said de-spin tube for rotating the latter at one-half the rotational speed of said indexing and scanning mirrors, a shutter having two radially opposed sectors axially supported at their common apex on said housing for rotation relative thereto and for intermittently occluding the axially directed light from said scanning mirror, and a second transmission drivingly connected between said second motor and said shutter for rotating the latter one revolution for each aperture scanned by said scanning mirror;

whereby a sequence of pictures photographed at a relatively slow rate may be projected on a screen at a relatively fast rate.

2. A multiple-scan projector apparatus for quickly discerning moving objects from stationary objects detected in space, comprising:

a cylindrical housing, a strip film supply reel and a film take-up reel axially supported on the outside of said housing for rotation relative thereto, a film feed sprocket axially supported on the outside of said housing for rotation relative thereto and adjacent to said supply reel for unreeling the film therefrom, a camera supported on the outside of said housing adjacent to said sprocket for photographing a visual display of a planned position indicator on the film received from said sprocket, a first motor drivingly connected to said sprocket and said take-up reel for continuously transporting the film from said supply reel onto said take-up reel, a rapid process film developer supported on the outside of said housing adjacent to said camera for developing film received from said camera, a film drum coaxially supported inside of said housing for receiving the film from said developer around its circumference and for transporting the film to said take-up reel, said drum including a plurality of apertures equally spaced about the circumference with the distance between aperture centers equal to the distance between centers of pictures photographed on the film, an intermittent transmission drivingly connected between said first motor and said drum for intermittently rotating the latter at a relatively slow speed in angular increments equal to the angle subtended by the radial center lines of adjacent apertures, a light source coaxially mounted on said housing for directing the light therefrom along the housing axis, an indexing means coaxially supported in said drum for rotation relative thereto and inclined to direct the light from said condenser in a direction radially outward, a second motor drivingly connected to said indexing means for continuous rotation thereof at a relatively high speed, a first plurality of inclined optical elements fixed to the inside of said housing in a circle coaxial therewith for directing the radially outward light in a direction parallel to the housing axis, a second plurality of inclined optical elements fixed to the inside of said housing in a circle coaxial therewith for directing the parallel light in a direction radially inward through said apertures when registering therewith, the position of each element in said first and second pluralities being arranged about the housing axis to correspond with an aperture position during dwell of said intermittently rotating drum, a scanning means coaxially fixed to said indexing means for rotation therewith and inclined to direct the radially inward light in a direction along the housing axis, a de-spin tube coaxially supported in said housing for rotation relative thereto and for projecting the axially directed light from said scanning mirror onto a screen, and a transmission drivingly connected between said second motor and said de-spin tube for rotating the latter;

whereby a sequence of pictures photographed at a relatively slow rate may be projected on a screen at a relatively fast rate.

3. A multiple-scan projector apparatus for quickly discerning moving objects from stationary objects detected in space, comprising:

a cylindrical housing, a strip film supply reel and a film take-up reel axially supported on the outside of said housing for rotation relative thereto, a film feed sprocket axially supported on the outside of said housing for rotation relative thereto and adjacent to said supply reel for unreeling the film therefrom, a shutter-less camera supported on the outside of said housing adjacent to said sprocket for photographing a visual display of a planned position indicator on the film received from said sprocket, a first motor drivingly connected to said sprocket and said take-up reel for continuously transporting the film from said supply reel onto said take-up reel, a rapid process film developer supported on the outside of said housing adjacent to said camera for developing film received from said camera, a film drum coaxially supported inside of said housing for receiving the film from said developer around its circumference and for transporting the film to said take-up reel, said drum including a plurality of apertures equally spaced about the circumference with the distance between aperture centers equal to the distance between centers of pictures photographed on the film, an intermittent transmission drivingly connected between said first motor and said drum for intermittently rotating the latter at a relatively slow speed in angular increments equal to the angle subtended by the radial center lines of adjacent apertures, a light source, an indexing means coaxially supported in said drum for rotation relative thereto and for directing the light in a direction radially inward through said apertures when registering therewith, a second motor drivingly connected to said indexing means for continuous rotation thereof at a relatively high speed, a scanning means coaxially fixed to said indexing means for rotation therewith and inclined to direct the radially inward light in a direction along the housing axis, a de-spin tube coaxially supported in said housing for rotation relative thereto and including a collimator, and image inversion means, a transfer lens and a projecting lens each coaxial with the housing axis for projecting the axially directed light from said scanning means onto a screen, a first transmission drivingly connected between said second motor and said de-spin tube for rotating the latter at one-half the rotational speed of said indexing and scanning means, a shutter axially supported on said housing for rotation relative thereto and for intermittently occluding the axially directed light from said scanning means, and a second transmission drivingly connected between said second motor and said shutter for rotating the latter one revolution for each aperture scanned by said scanning means;

whereby a sequence of pictures photographed at a relatively slow rate may be projected on a screen at a relatively fast rate.

4. A multiple-scan projector apparatus for quickly discerning moving objects from stationary objects detected in space, comprising:
- a cylindrical housing,
- a camera supported on the outside of said housing for photographing a visual display of stationary and moving objects on film,
- a film developer supported on the outside of said housing adjacent to said camera for developing the film received from said camera,
- a film drum coaxially supported inside of said housing for receiving the film from said developer around its circumference, said drum including a plurality of apertures equally spaced about the circumference with the distance between aperture centers equal to the distance between centers of pictures photographed on the film,
- an intermittent drive connected to said drum for intermittent rotation thereof at a relatively slow speed in angular increments equal to the angle subtended by the radial center lines of adjacent apertures,
- a light source coaxially mounted on said housing for directing the light from said source along the housing axis,
- an indexing means coaxially supported in said drum for rotation relative thereto and for directing the light from said source radially inward through said apertures when registering therewith,
- a continuous drive connected to said indexing means for continuous rotation thereof at a relatively high speed,
- a scanning means coaxially fixed to said indexing for rotation therewith and for directing the radially inward light along the housing axis,
- a de-spin tube coaxially supported in said housing for rotation relative thereto for projecting the axially directed light from said scanning means onto a screen, and
- a shutter on said housing for rotation relative thereto and for intermittently occluding the axially directed light from said scanning means,
- said tube and said shutter being drivingly connected to said continuous drive.

5. A multiple-scan projector apparatus comprising, in combination:
- a housing,
- a strip film supply,
- a camera for receiving film from said supply,
- a film developer on said housing for receiving the film from said camera,
- a film drum axially supported inside said housing for receiving the film from said developer and including a plurality of apertures equally spaced about the circumference with the distance between aperture centers equal to the distance between centers of pictures photographed on the film,
- first motor means drivingly connected to said drum for intermittently rotating the latter at a relatively slow rate in angular increments equal to the angle subtended by the radial center lines of adjacent apertures,
- a light source mounted on said housing for directing light along the drum axis,
- an indexing mirror coaxially supported in said drum for rotation relative thereto and inclined to reflect the light from said source in a direction radially outward,
- a second motor means drivingly connected to said indexing mirror for continuous rotation thereof at a relatively high speed,
- first and second pluralities of inclined mirrors fixed to the inside of said housing in a circle coaxial with said drum for reflecting the radially outward light in a direction radially inward through said apertures when registering, the position of each mirror in said first and second pluralities being arranged about the drum axis to correspond with an aperture position during dwell of said intermittently rotating drum,
- a scanning mirror coaxially fixed to said indexing mirror for rotation therewith and inclined to reflect the radially inward light in a direction along the drum axis,
- a de-spin optical tube supported in said housing coaxial with said drum for rotation relative thereto and for projecting the axially directed light from said scanning mirror onto a screen, said tube being rotated at one-half the rotational speed of said indexing and scanning mirrors, and
- a shutter axially supported on said housing for rotation relative thereto for intermittently occluding the axially directed light from said scanning mirror, said shutter being rotated one revolution for each aperture scanned by said scanning mirror;
- whereby a sequence of pictures photographed at a relatively slow rate may be projected on a screen at a relatively fast rate.

6. A multiple-scan projector apparatus comprising, in combination:
- a camera for receiving strip film,
- a film developer on said housing for receiving the film from said camera,
- a film drum for receiving the film from said developer and including a plurality of apertures equally spaced about the circumference with the distance between aperture centers equal to the distance between centers of pictures photographed on the film,
- first motor means drivingly connected to said drum for intermittently rotating the latter at a relatively slow rate in angular increments equal to the angle subtended by the radial center lines of adjacent apertures,
- a light source,
- an indexing means coaxially supported in said drum for rotation relative thereto to direct the light from said source radially inward through said apertures when registering therewith,
- a second motor means drivingly connected to said indexing means for continuous rotation thereof at a relatively high speed,
- a scanning means coaxially fixed to said indexing means for rotation therewith and inclined to direct the radially inward light in a direction along the drum axis,
- a de-spin optical tube supported in said housing coaxial with said drum for rotation relative thereto and for projecting the axially directed light from said scanning means onto a screen, said tube being rotated at one-half the rotational speed of said indexing and scanning means, and
- a shutter axially supported on said housing for rotation relative thereto for intermittently occluding the axially directed light from said scanning means, said shutter being rotated one revolution for each aperture scanned by said scanning means;
- whereby a sequence of pictures photographed at a relatively slow rate may be projected on a screen at a relatively fast rate.

References Cited by the Examiner
UNITED STATES PATENTS
3,057,252  10/1962  Coburn _____ 352—84

NORTON ANSHER, *Primary Examiner.*

EVON C. BLUNK, *Examiner.*

RICHARD A. WINTERCORN, *Assistant Examiner.*